United States Patent
Hampel et al.

(10) Patent No.: US 8,738,025 B2
(45) Date of Patent: May 27, 2014

(54) MOBILE-SERVER PROTOCOL FOR LOCATION-BASED SERVICES

(75) Inventors: Karl Georg Hampel, New York, NY (US); Suryanarayan Perinkulam, Clinton, NJ (US); Viswanath Poosala, Basking Ridge, NJ (US)

(73) Assignee: Alcatel Lucent, Paris (FR)

( * ) Notice: Subject to any disclaimer, the term of this patent is extended or adjusted under 35 U.S.C. 154(b) by 1571 days.

(21) Appl. No.: 12/130,142

(22) Filed: May 30, 2008

(65) Prior Publication Data

US 2009/0298513 A1 Dec. 3, 2009

(51) Int. Cl.
H04W 4/02 (2009.01)

(52) U.S. Cl.
USPC ..................... 455/456.1; 455/456.2

(58) Field of Classification Search
CPC ... H04L 29/08657; H04W 4/16; H04W 48/16
USPC ..................... 455/456.1, 445, 435.1
See application file for complete search history.

(56) References Cited

U.S. PATENT DOCUMENTS

| | | | |
|---|---|---|---|
| 5,325,302 A | 6/1994 | Izidon et al. | |
| 2002/0095333 A1 | 7/2002 | Jokinen et al. | |
| 2002/0164977 A1 | 11/2002 | Link, II et al. | |
| 2002/0186166 A1* | 12/2002 | Spratt | 342/464 |
| 2003/0198346 A1 | 10/2003 | Meifu et al. | |
| 2004/0185871 A1* | 9/2004 | Somani et al. | 455/456.1 |
| 2004/0198398 A1 | 10/2004 | Amir et al. | |
| 2004/0209602 A1 | 10/2004 | Joyce et al. | |
| 2005/0221843 A1 | 10/2005 | Friedman et al. | |
| 2005/0227705 A1 | 10/2005 | Rousu et al. | |
| 2005/0227711 A1 | 10/2005 | Orwant et al. | |
| 2006/0045030 A1 | 3/2006 | Bieselin | |
| 2006/0058037 A1 | 3/2006 | Kenyon | |
| 2006/0276214 A1 | 12/2006 | Harris et al. | |
| 2007/0270133 A1 | 11/2007 | Hampel et al. | |
| 2007/0270160 A1 | 11/2007 | Hampel et al. | |
| 2007/0270161 A1 | 11/2007 | Hampel et al. | |
| 2007/0270162 A1 | 11/2007 | Hampel et al. | |
| 2007/0270166 A1 | 11/2007 | Hampel et al. | |

FOREIGN PATENT DOCUMENTS

| | | |
|---|---|---|
| EP | 1670268 A | 6/2006 |
| EP | 2034754 A1 | 3/2009 |
| JP | 2003061129 A | 2/2003 |
| JP | 2003219456 A | 7/2003 |
| JP | 2008517490 A | 5/2008 |
| JP | 2008519555 A | 6/2008 |
| WO | PCT/2006/071271 A2 | 7/2006 |
| WO | PCT/2007/142085 A1 | 12/2007 |
| WO | PCT/US2009/045440 | 11/2009 |

* cited by examiner

*Primary Examiner* — Phuoc H Doan
(74) *Attorney, Agent, or Firm* — Ryan, Mason & Lewis, LLP

(57) ABSTRACT

Location-based services are provided in a communication system comprising a wireless network. In one aspect, a mobile user device sends a trigger message to a server over a wireless link of the network. The server in response to the trigger message sends an update message to the mobile user device over the wireless link. The update message is sent within a period of time after the trigger message that is less than a dormancy time of the wireless link. The update message may specify, for example, a defined area around a location identified in the trigger message, one or more stationary fences associated with the mobile user device that overlap with the defined area and that are active or become active within a designated time frame, and a projected time frame within which a proximity-crossing event is likely to occur for at least one user device pair that includes the mobile user device.

23 Claims, 3 Drawing Sheets

STATIONARY FENCE

MOVING FENCE

MOBILE-SERVER PROTOCOL FOR LOCATION-BASED SERVICES

FIELD OF THE INVENTION

The present invention relates generally to wireless communication systems, and more particularly to techniques for providing location-based message delivery and other services to mobile user devices in such systems.

BACKGROUND OF THE INVENTION

A wide variety of different types of wireless communication systems are known. For example, a typical wireless cellular network includes a multitude of interconnected base stations which communicate with mobile user devices within defined coverage areas.

Also, numerous techniques have been developed which deliver advertising or other types of messages to mobile user devices based on the current locations of those devices. Thus, if a given user device is determined to be in close proximity to a particular retail establishment, an advertisement or other message associated with that establishment may be delivered to the user device.

Examples of techniques of this type are described in U.S. Patent Application Publication Nos. 2002/0095333, entitled "Real-Time Wireless E-Coupon (Promotion) Definition Based On Available Segment," 2002/0164977, entitled "System and Method for Providing Short Message Targeted Advertisements Over a Wireless Communications Network," 2003/0198346, entitled "Push Delivery Service Providing Method, Information Providing Service System, Server System and User Station," 2004/0209602, entitled "Location-Based Content Delivery," 2005/0221843, entitled "Distribution of Location Specific Advertising Information Via Wireless Communication Network," 2005/0227711, entitled "Method and Apparatus for Creating, Directing, Storing and Automatically Delivering a Message to an Intended Recipient Upon Arrival of a Specified Mobile Object at a Designated Location," and 2006/0058037, entitled "Custom Information For Wireless Subscribers Based on Proximity."

Unfortunately, conventional wireless communication systems such as those described in the above-cited references suffer from a number of significant drawbacks. For example, the conventional systems are typically configured in a manner which can lead to excessive location queries or other types of location-related communications between the base stations and the mobile user devices, thereby undermining the ability of the systems to support their primary voice and data traffic functionality.

Improved techniques for delivering location-based services to mobile user devices that alleviate the problems noted above are described in U.S. Patent Application Publication Nos. 2007/0270133, entitled "Mobile-Initiated Location Measurement," 2007/0270160, entitled "Traffic-Synchronized Location Measurement," 2007/0270161, entitled "Broadcast Channel Delivery of Location-Based Services Information," 2007/0270162, entitled "Reverse Lookup of Mobile Location," and 2007/0270166, entitled "Prioritization of Location Queries in a Location-Based Services System," all of which are commonly assigned herewith and incorporated by reference herein.

An issue that arises in providing location-based services to mobile user devices relates to what is referred to as herein as "fence crossing," which generally refers to determining when a given mobile user has crossed a designated boundary. A fence-crossing event may be used, for example, to control the delivery of a particular message to a given mobile user device, or to control the provision of other types of location-based services.

Conventional techniques for dealing with fence crossings fail to provide optimal performance in delivery of location-based services, particularly in mass market, high-volume applications, which involve many users, many fences per user, etc. For example, the conventional techniques often require excessive messaging over an air interface of the wireless network, thereby consuming system resources and adversely impacting system performance. Also, such messaging can result in increased power consumption in the mobile user device, thereby adversely impacting battery life. Accordingly, new techniques are needed which can further improve the delivery of location-based services through enhanced processing of fence-crossing information.

SUMMARY OF THE INVENTION

The present invention in one or more illustrative embodiments provides improved techniques for delivering location-based services to mobile user devices associated with a wireless network. These techniques are particularly beneficial in implementations in which mobile user devices are able to perform periodic location probing using, for example, the Global Positioning System (GPS) or assisted GPS (aGPS).

In accordance with one aspect of the invention, a mobile user device sends a trigger message to a server over a wireless link of the network. The server in response to the trigger message from the mobile user device sends an update message to the mobile user device over the wireless link. The update message is sent within a period of time after the trigger message that is less than a dormancy time of the wireless link.

The server may be configured to determine if the trigger message contains one or more fence-crossing alerts. For each such fence-crossing alert, the server determines if a corresponding fence is valid and if the fence is valid forwards the alert to an application.

The server is also configured to define an area around a location identified in the trigger message, to select stationary fences associated with the mobile user device that overlap with the defined area and that are active or become active within a designated time frame, to determine whether or not one or more proximity-crossing events have occurred with respect to the location and one or more moving fences of respective user device pairs that include the mobile user device, and for a given proximity-crossing event that has occurred, to send a corresponding alert to an application.

The server may also determine a projected time frame within which a proximity-crossing event is likely to occur for at least one user device pair that includes the mobile user device. The update message may include the defined area, the selected stationary fences and the projected time frame.

As indicated previously, the mobile user device may be configured to perform periodic location probe operations to determine its location. After performing a given location probe operation, the mobile user device evaluates if the device has crossed one of the stationary fences or a boundary of the defined area. If the mobile user device has crossed one of the stationary fences or the boundary of the defined area, it sends an additional trigger message containing one or more corresponding fence-crossing alerts. The mobile user device may also send an additional trigger message after the projected time frame since receipt of the update message has elapsed.

The mobile user device may also, after performing a given location probe operation, update the projected time frame. The mobile user device may then send an additional trigger message after the updated projected time frame since receipt of the update message has elapsed.

The mobile user device may update the projected time frame in the following manner. If an average speed $s_{avg}$ of the mobile user device since receipt of the update message is less than a designated maximum speed $s_{max}$, the projected time frame may be updated in accordance with the following equation:

$$\Delta T_T = \Delta T_Z (2 - \min(1, s_{avg}/s_{max})),$$

where $\Delta T_T$ denotes the updated projected time frame and $\Delta T_Z$ denotes the projected time frame as received in the update message. Also, the updated projected time frame may be subject to certain minimum and maximum values. For example, if $\Delta T_T$ is less than a specified minimum value Tmin, then $\Delta T_T$ may be set to Tmin, and if $\Delta T_T$ is greater than a specified maximum value Tmax or no moving fences are present, then $\Delta T_T$ may be set to Tmax.

The illustrative embodiments provide a number of significant advantages relative to conventional systems. For example, through use of a particularly efficient mobile-server protocol, processing of fence-crossing information is greatly facilitated. This conserves air interface resources of the wireless network, and battery resources of the mobile user device, resulting in improved performance in systems delivering location-based services. The illustrative embodiments are particularly well suited for used in geofencing applications that address mass markets or are otherwise of high volume.

These and other features and advantages of the present invention will become more apparent from the accompanying drawings and the following detailed description.

DETAILED DESCRIPTION OF THE INVENTION

The present invention will be illustrated below in conjunction with exemplary wireless communication systems and associated location-based services. It should be understood, however, that the invention is not limited to use with any particular type of wireless system or location-based service(s). The disclosed techniques are suitable for use with a wide variety of other systems and in providing numerous alternative services. For example, the described techniques are applicable to many different types of wireless networks, including those utilizing well-known standards such as UMTS, W-CDMA, CDMA2000, HSDPA, Long-Term Evolution (LTE), IEEE 802.11 (Wi-Fi), IEEE 802.16 (WiMax), etc.

The term "wireless communication system" as used herein is intended to include these and other types of wireless networks, as well as sub-networks or other portions of such networks and combinations of multiple networks operating in accordance with potentially different standards. A given wireless communication system may also include as a component thereof one or more wired networks or portions of such wired networks.

Figure 1A:
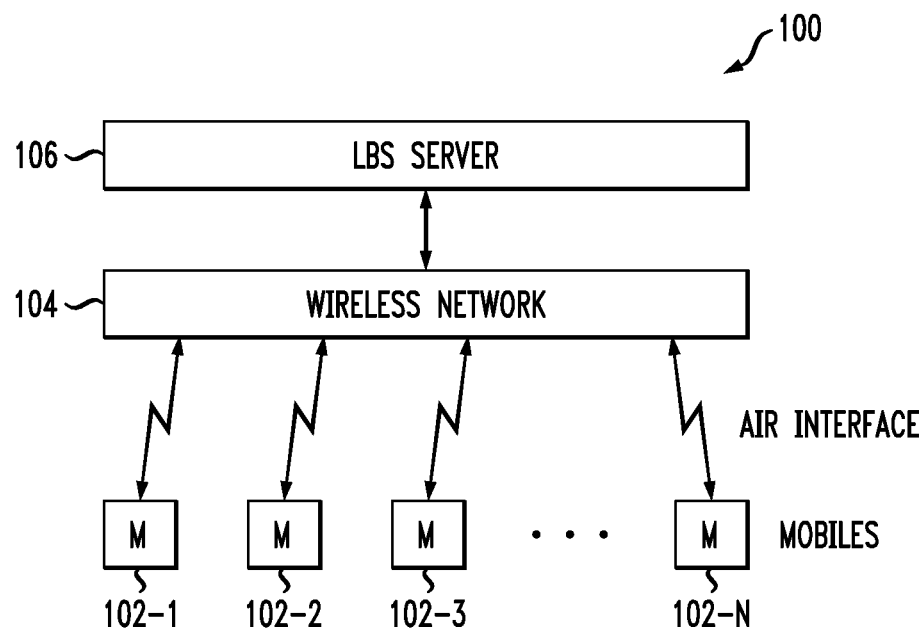
FIG. 1A is a block diagram of a communication system in an illustrative embodiment of the invention.

FIG. 1A shows a wireless communication system 100 in an illustrative embodiment of the invention. The communication system 100 comprises a plurality of mobile user devices 102-1, 102-2, . . . 102-N, each also being denoted M in the figure, that communicate over an air interface with a wireless network 104. The wireless network 104 has associated therewith a location-based services (LBS) server 106. Although shown as a separate element in the figure, the LBS server 106 in other embodiments may be incorporated in whole or in part into the wireless network 104.

The mobile user devices 102, which are also referred to herein as simply "mobiles," may be mobile telephones, portable or laptop computers, personal digital assistants (PDAs), wireless email devices, or other portable communication devices, in any combination. The particular number N of mobile user devices 102 in the system 100 is arbitrary, and may be any desired number that can be supported by the system.

Each of the mobile user devices 102 is generally associated with a particular system user. However, the term "user" as utilized herein is intended to be construed broadly, and depending on the context may refer to the particular entity associated with a given mobile user device, or the mobile user device itself, or a combination of both.

The wireless network 104 may be a wireless cellular network, such as, for example, an otherwise conventional UMTS network, although as indicated above a wide variety of other types of wireless networks may be used in implementing the invention. The wireless network 104 may comprise, for example, one or more base stations configured to communicate with mobile user devices 102 in a conventional manner.

The LBS server 106 will typically comprise one or more computers or other processing devices. For example, server 106 may comprise one or more server elements of a Gcast™ system or other LBS system of the type described in the above-cited U.S. Patent Application Publication No. 2007/0270133.

Although only a single server 106 is shown in FIG. 1A, the system 100 could of course be configured to include multiple such servers. Mobile-server protocols to be described herein in the context of a single server can be extended in a straightforward manner to accommodate multiple servers.

Figure 1B:
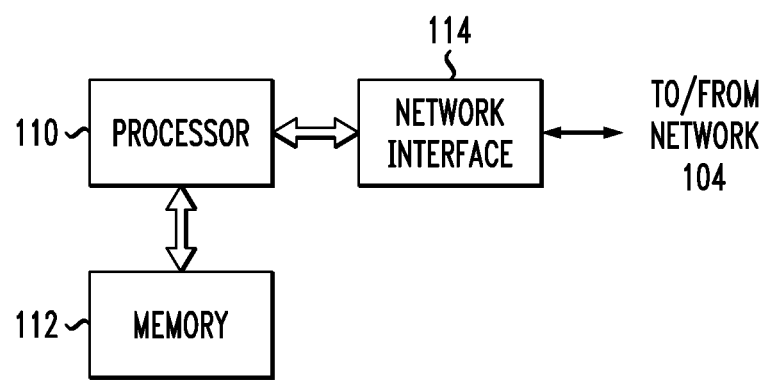
FIG. 1B is a block diagram of a given processing device of the FIG. 1A system.

FIG. 1B shows one possible implementation of a given processing device of the system 100, which may represent one of the mobile user devices 102 or the LBS server 106. The processing device comprises a processor 110 coupled to a memory 112. The processor 110 is also coupled to a network interface 114 through which the processing device communicates with the wireless network 104.

Mobile-server protocols and associated LBS processing tasks can be implemented at least in part in the form of software stored in memory 112 and executed by processor 110. The memory 112 is one example of what is more generally referred to herein as a processor-readable storage medium containing executable program code.

The processor 110 may comprise, for example, a microprocessor, a central processing unit (CPU), an application-specific integrated circuit (ASIC), or other type of digital data processor. The memory 112 may comprise, for example, random access memory (RAM), read-only memory (ROM), disk-based memory, or other types of storage elements, in any combination. The network interface 114 may comprise, for example, conventional transceiver circuitry configured in accordance with one or more of the above-noted standards.

It will be assumed for purposes of this illustrative embodiment that the LBS server 106 stores application-specific information such as a user database, fence information for each user, etc. It is further assumed that mobile-server interaction utilizes a wireless link provided by the wireless network 104.

The fence information processed in system 100 may comprise stationary fences and moving fences, as will now be described with reference to FIGS. 2A and 2B. Stationary fences are fixed with respect to a particular geographic location, while moving fences move with a particular mobile user device. LBS applications that utilize fence-crossing information associated with moving or stationary fences are also referred to herein as "geofencing" applications.

Figure 2A:
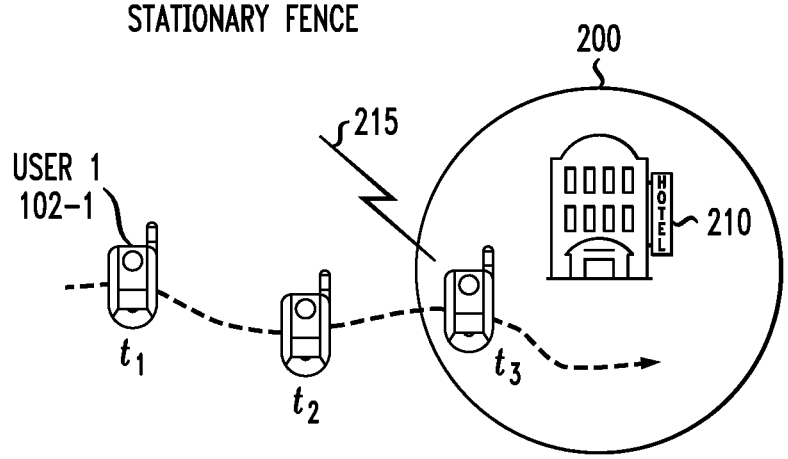
FIGS. 2A and 2B illustrates respective stationary and moving fences in the system of FIG. 1A.

FIG. 2A shows an example of a stationary fence 200 which comprises a circular boundary defined around a particular landmark 210. As indicated in the figure, a user denoted User 1 is associated with a particular mobile user device 102-1 and moves within the geographic area that includes the stationary fence 200. At times $t_1$ and $t_2$, the mobile user device 102-1 is outside the fence as indicated. At time $t_3$, the mobile user device 102-1 has crossed the fence 200 and a corresponding fence-crossing alert 215 is generated in the system 100.

Figure 2B:
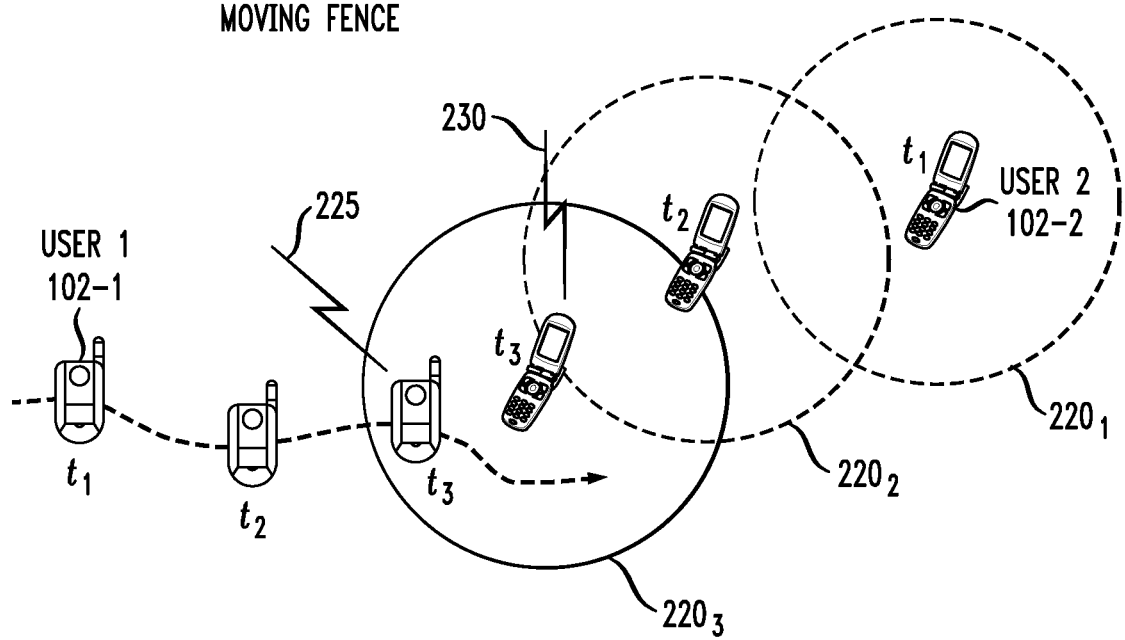

FIG. 2B shows an example of a moving fence 220 which comprises a circular boundary defined around a particular user denoted User 2. User 2 is associated with mobile user device 102-2. The mobile user device 102-2 and its corresponding fence 220 move as indicated. Thus, the moving fence 220 is more particularly denoted by $220_1$ at time $t_1$, $220_2$ at time $t_2$ and $220_3$ at time $t_3$. User 1 is also moving, again in a manner similar to that shown in FIG. 2A. At times $t_1$ and $t_2$, the mobile user device 102-1 is outside the moving fence 220 of User 2 as indicated. At time $t_3$, the mobile user device 102-1 has crossed the moving fence 220 of User 2 and corresponding fence-crossing alerts 225 and 230 are generated in the system 100. This fence-crossing event in FIG. 2B is an example of what is referred to herein as a "proximity-crossing event."

It should be apparent from the examples of FIGS. 2A and 2B that stationary fences such as fence 200 require location tracking of individual users, while moving fences such as fence 220 require location tracking of pairs of users. Stationary fences are thus assigned to individual users, while moving fences are assigned to pairs of users. Although shown as circular in these examples, stationary and moving fences can have any number of other shapes or configurations, and may be open ended rather than closed. Also, fence-crossing alerts can be sent upon crossing a fence in either or both directions. Moving and stationary fences may also have finite lifetimes, that is, may be valid only for designated periods of time.

A stationary fence may be defined by information such as a geographic center location, a geographic boundary description with respect to the center location, a condition for generation of a crossing alert with respect to the geographic boundary, a start time, and an end time. A moving fence may be defined by information such as a geographic boundary description with respect to one location, a condition for generation of a crossing alert with respect to the geographic boundary, a start time, and an end time. Of course, other types of information may be used to define stationary and moving fences in other embodiments.

The geographic boundaries and other information associated with stationary and moving fences are also referred to herein as "Z-space."

It should be noted that for fence-crossing evaluation for moving fences, the geographic boundary is attached to the location of one of the users. Then fence-crossing conditions are evaluated with respect to the location of the other user for this boundary. This operation is symmetric with respect to the users of the user pair.

Geofencing applications involving stationary or moving fences will typically require a variety of tasks to be performed in the system 100, such as location probing, location processing, evaluation of user location with respect to one or more fences, evaluation of fence-crossing conditions, forwarding of fence-crossing alerts, and fence processing, such as arrival of new fences, and expiration or cancellation of existing fences. Implementation of these tasks can require that substantial amounts of information be exchanged between each of the mobiles 102 and the server 106 over the air interface of the wireless network 104, particularly for geofencing applications that address mass markets or are otherwise of high volume (i.e., many users, many fences per user, etc). Thus, high-volume geofencing applications can result in overutilization of the air interface of the wireless network and can also adversely impact mobile battery consumption. As will be described below, an additional cost may be assigned to every mobile-server connection required to transfer information between these system elements. Further, mobile-server connections initiated by the server will generally require paging of the mobile, which creates a large burden on the paging channel. Accordingly, the system resource costs and associated performance impact of the geofencing information exchange can be prohibitive when using conventional techniques.

The system 100 in an illustrative embodiment implements an improved mobile-server communication protocol that is particularly beneficial in high-volume geofencing applications. Examples of this mobile-server protocol will be described below with reference to FIGS. 3 and 4. The mobile-server protocol may be viewed as being based in part on an economic model in which it is assumed that every mobile-to-server connection initiated by the mobile has a certain fixed cost. It is also assumed that every server-to-mobile connection initiated by the server via Short Message Service (SMS), Wireless Access Protocol (WAP) push or similar conventional techniques has a significantly higher cost. Because of this difference in cost, the mobile-server protocol in the illustrative embodiment primarily utilizes mobile-initiated connections. Further, each fence-crossing alert is assumed to carry a fixed revenue amount. With the above assumptions, the mobile-server protocol in the present embodiment may be viewed as performing a type of profit maximization, in that every cost increase has to be justified by a corresponding revenue increase.

Figure 3:
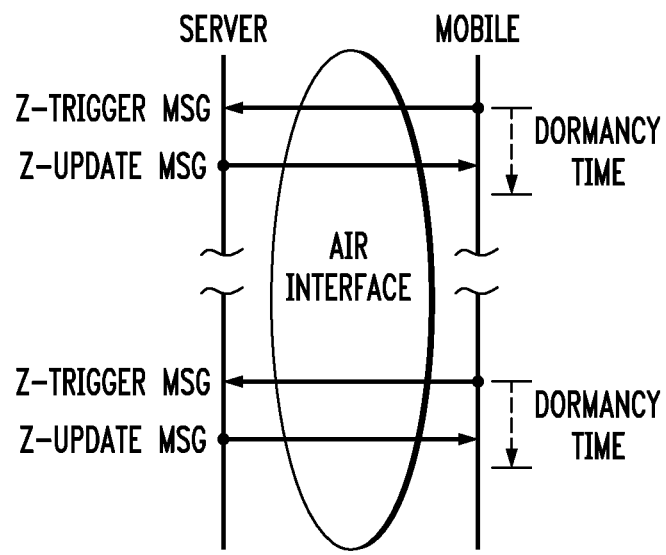
FIGS. 3 and 4 show exemplary mobile-server protocols that may be implemented in the FIG. 1A system to support provision of location-based services based on fence tracking.

Referring now to FIG. 3, messages associated with the mobile-server protocol of the illustrative embodiment are communicated between a given one of the mobiles 102 and the server 106 in the manner shown. These messages include Z-trigger messages and Z-update messages, which relate to the above-noted Z-space.

In accordance with the protocol, the mobile sends a Z-trigger message to the server. This message contains information related to the mobile location, e.g., the mobile's last location measurement. It can also contain fence-crossing alerts. Responsive to the Z-trigger message, the server sends a Z-update message to the mobile. This message contains what is referred to herein as a "Z-parameter set." This parameter set is used by the mobile to determine the appropriate time or location at which it has to send the next Z-trigger message. The Z-update message may also contain information on stationary fences.

The protocol further requires that the Z-update message be sent in immediate response to the Z-trigger message. More specifically, the Z-update message is sent within a sufficiently short time interval after the Z-trigger message has occurred, where the interval is shorter than the dormancy time of the wireless link. Therefore, the same wireless connection can be used for the Z-trigger message as for the Z-update message. The term "dormancy time" as used herein is therefore intended to encompass, for example, an amount of time for which a given established wireless connection can remain unused or dormant without being reallocated or otherwise disconnected.

While the Z-update message carries information, it also serves as a confirmation that the server has received and processed the Z-trigger message. It is not necessary for the mobile to send a confirmation to the server on the correct reception of the Z-update. In case the mobile does not receive the Z-update within the dormancy time after the Z-trigger, it has to assume that either Z-trigger or Z-update got lost. In this case, it can just send another Z-trigger.

Figure 4:
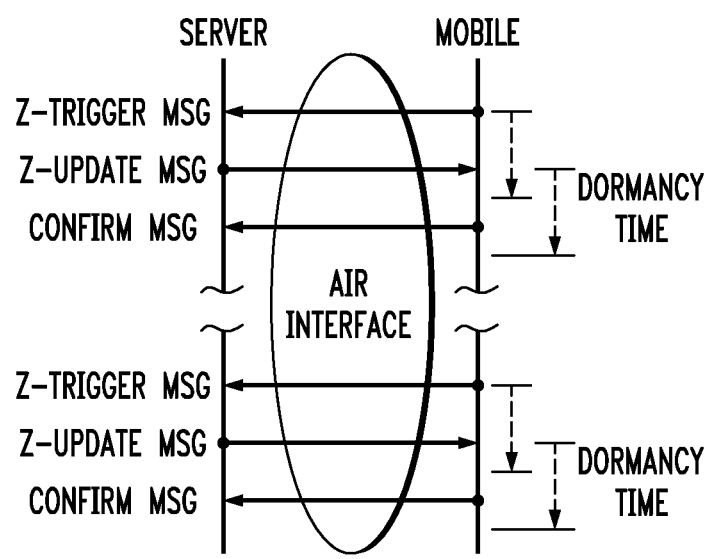

Alternatively, the FIG. 3 protocol can be extended to include an additional confirmation message sent from mobile to server to confirm the reception of the Z-update message, as shown in FIG. 4. This confirmation message should be sent within the dormancy time after receipt of the Z-update message, as indicated in the latter figure.

The sequence of messages of the mobile-server protocol of FIG. 3 or FIG. 4 provides a resource-efficient data exchange between mobile 102 and server 106, and the processing of all tasks associated with geofencing, for both stationary and moving fences, is built around this protocol. This means that the entire mobile-server interaction should rely only on this message sequence, with the mobile and server processing being configured such that the frequency of this sequence is minimized, as will now be described.

The server in the present embodiment is assumed to store a user database as well as information on stationary and moving fences. Upon reception of the Z-trigger message from user U, the server performs the following tasks:

1. The server saves the location and time stamp in memory or database for U.

2. The server checks if the Z-trigger message received from the mobile contains any fence-crossing alerts. For each fence-crossing alert, the server evaluates if the corresponding fence is still valid (e.g., it has not been revoked). If the fence is valid, the alert is forwarded to the appropriate application.

3. The server defines a geographically confined area $A_Z$ around the location contained in the Z-trigger message.

4. The server selects all stationary fences of U that overlap with $A_Z$ and that are active or become active within a time frame of Tmax.

5. The server evaluates proximity-crossing events with respect to U's updated location and all moving fences of all user pairs that contain U. If such proximity-crossing events have occurred, the server sends the corresponding alert(s) to the appropriate application.

6. Based on U's new location, the server projects a time frame $\Delta T_Z$ which specifies when the next proximity-crossing event could occur under probabilistic assumptions of last location and mobility of all users that are contained in a user pair together with U.

7. The server sends the Z-update message to U with the parameters for $A_Z$, $\Delta T_Z$ and all selected stationary fences.

The mobile in the present embodiment is assumed to store information on all stationary fences forwarded by the server, the above-noted parameters $A_Z$, $\Delta T_Z$ from the Z-update message, and two additional parameters Tmin and Tmax. Upon reception of the Z-update message from the server, the mobile performs the following steps:

1. It updates its memory with the stationary fences, $A_Z$ and $\Delta T_Z$, as provided in the Z-update message.

2. It performs periodic location probe operations to determine its location.

3. After each location probe operation, it evaluates if it has crossed one of the stationary fences or the boundary of $A_Z$. If one of these events has occurred it sends a Z-trigger message to the server with the corresponding fence-crossing alerts.

4. After each location probe operation, it estimates a time frame $\Delta T_T$ based on $\Delta T_Z$ and its actual movement. When it observes that the time frame since the reception of the last Z-update message is larger than $\Delta T_T$, it sends the next Z-trigger message.

It is to be appreciated that the particular messages of the protocols of FIGS. 3 and 4, and the associated server and mobile processing tasks as described above, are presented by way of illustrative example only. Other embodiments may utilize different types of trigger and update messages, and other divisions between mobile and server of particular processing tasks associated with geofencing applications.

Referring again to the embodiment described above in conjunction with FIGS. 3 and 4, a more particular example of one possible implementation will now be described, indicating how the parameters for $A_Z$, $\Delta T_Z$, $\Delta T_T$, Tmin and Tmax can be set.

In this implementation, $A_Z$ has a disc shape with the center around the user's reported location. The radius of this disk is set so that the number of fences that overlap with the disk is less than or equal to the maximum number of fences the mobile can hold in storage or process in sufficient amount of time. The radius of the disk can be determined in a simple iterative sequence. As mentioned previously, numerous other shapes or configurations may be used for a given defined area.

The time frame $\Delta T_Z$ may represent the projected time that is required for U and the other user of a given user pair to approach to the proximity where an alert should be sent under worst-case conditions, assuming both users go onto a collision course right after their respective last location update (i.e., Z-trigger message) and move with a certain realistic maximum speed $s_{max}$ (e.g., highway speed). In case user U is in user pairs with multiple users, the minimum of their respective worst-case time-to-alert values may be taken.

The time Tmax represents a maximum bound to $\Delta T_Z$, and may be selected as, for example, 30 to 60 minutes.

The time Tmin represents a minimum bound to $\Delta T_Z$, and may be derived from the ratio of a minimum spatial granularity for fences and the value for $s_{max}$.

Upon reception of a Z-update message, the mobile sets $\Delta T_T = \Delta T_Z$. Whenever the mobile updates its own location, it may adjust $\Delta T_T$ according to the average speed $s_{avg}$ it has had since the last Z-update message. If $s_{avg} < s_{max}$, $\Delta T_T$ can be increased to:

$$\Delta T_T = \Delta T_Z (2 - \min(1, s_{avg}/s_{max})).$$

This keeps the above worst-case collision-course condition alive but stretches the time to the next Z-trigger message as much as possible. Clearly, $\Delta T_T$ cannot extend past $2\Delta T_Z$, since the other user may still be approaching with $s_{max}$ under worst-case conditions. If $\Delta T_T < $Tmin, then $\Delta T_T$ is set to Tmin. If $\Delta T_T > $Tmax or no moving fences are present, $\Delta T_T = $Tmax.

An additional arrangement can be introduced when mobiles are stationary for a prolonged amount of time. For example, if the mobile moves by less than the spatial granularity for $\Delta T_T$ and $\Delta T_T < $Tmax, then the mobile can disobey the requirement to send a Z-trigger message after $\Delta T_T$. When the server realizes that the mobile has not updated its time for a time frame of $2\Delta T_Z$, it concludes that the mobile has been stationary since its last Z-trigger message. Hence, the mobile's last location is still valid. A stationary mobile should still send a Z-trigger message every Tmax, just in case new fences have arrived. It should also send a Z-trigger message when it starts to move again, when it overcomes the spatial granularity and when $\Delta T_T$ has already expired.

It should again be noted that $A_Z$ can have any spatial structure. It can, for instance, be adapted to the local road infrastructure as well as the typical mobility pattern of a specific user. Such approaches may reduce the Z-trigger frequency due to $A_Z$-boundary crossings. $A_Z$ can further have a maximum bound derived from $s_{max}$ and Tmax. This can reduce the number of fences associated with the mobile and thereby improve its battery utilization.

The mobile-server protocol described above can be modified to include a server-to mobile stimulus message using, for instance, SMS or WAP push. Upon this stimulus, the mobile sends a Z-trigger message. This stimulus can be sent when stationary fences arrive and become active before the mobile has sent the next Z-trigger message. Since stimulus messages are not mandatory for the proper functioning of the system, they can be invoked for an additional charge to reimburse the extra cost for the SMS (e.g., the system charges a higher price for "urgent fences").

The illustrative embodiments described above provide a number of significant advantages relative to conventional techniques.

For example, the mobile-server protocol avoids expensive server-initiated messaging.

It also realizes a balance between costs and revenue opportunities, in that the number of mobile-server connections per time frame, which is a measure for the overall cost, follows the number of fences, which is a measure of potential revenue.

In addition, fence-crossing evaluation with respect to stationary fences occurs on the mobile. This is more efficient than server-based processing since the lifetime of stationary fences is usually much longer than the time interval between the user's location updates. Further, the introduction of $A_Z$ allows restricting the number of fences held and processed by the mobile to the mobile's memory- and processing-capacity constraints. Therefore, every user can have a very large number of stationary fences while still taking advantage of mobile-based fence-crossing evaluation. Further, using the $A_Z$ information forwarded from the server, the mobile autonomously determines when it needs a fence update and can request fence updates via the cost-effective mobile-server protocol. The fence updates therefore occur only when necessary, and are initiated by the mobile. This avoids costly server-initiated fence updates.

Furthermore, fence-crossing evaluation for moving fences is performed on the server. This is superior to performing such evaluation on the mobile since location updates can use the cost-effective mobile-server protocol.

For moving fences, the server provides a guidance time window to both mobiles in a given user pair. This reduces the location-update frequency substantially. When two users approach each other, the total number of location updates grows logarithmically with their initial distance. When the users come closer, the location-update frequency reaches a saturation given by the finite spatial granularity. However, these location updates are provided at very low cost via the mobile-server protocol.

It should be noted that the system 100 may be utilized to implement a wide variety of LBS applications, including both pull services and push services.

Pull services may involve, for example, requesting that location-relevant information be sent based on the geographic location of a trackee. The requester and the trackee can be the same person. The information can be forwarded to requester, trackee or a third party. More particular examples include a buddy locator which allows finding the location of a friend or child at a certain time. Another example is a directory service, where a user requests advertising or events taking place in his or her geographic vicinity.

Push services may involve, for example, forwarding location-relevant information when the trackee crosses a designated fence. Applied to the directory service, notices of local events may be sent to a user upon entering the zone where they take place. Another example is the child tracker, where parents are alerted when their child leaves a certain zone. Note that the alert can be sent to the trackee directly or via a third party (e.g., content provider) or it can solely be sent to a third party (e.g., parent in case of child tracker). Other push services may involve pairs of users, with alerts being provided based on the proximity between the two users. For example, an alert may be sent when the two users are within a certain predefined distance of one another. This type of alert can support friend-finder applications, for instance. It is also possible to send the alert when both users move away from each other beyond a predefined distance. This alert could support a child-tracker application for a traveling parent. As indicated previously in conjunction with FIG. 2B, applications providing proximity alerts between user pairs are examples of geofencing applications, where the fence is attached to one user and the other user takes the function of the trackee.

The illustrative embodiments described above can use various techniques to allow the mobile to perform location probing. For example, location measurements may be autonomously obtained by the mobile using well-known Global Positioning System (GPS) or assisted GPS (aGPS) techniques. In the case of aGPS, the mobile needs occasional updates from the network on satellite-reference information. These updates, however, can be rather infrequent (e.g., approximately once every 2 hours). It is also possible to use external GPS devices, with the resulting geolocation data being transferred to the mobile via a wired or wireless connection. Further, instead of GPS, other satellite-based systems can be used such as the European Galileo Positioning System or the Russian GLONASS System.

Other techniques that allow location probing to be conducted autonomously or semi-autonomously by the mobile may be used. For example, techniques based on the known spatial distribution of radio frequency transmitters within a building or on a campus may be used. The mobile receives signals from these transmitters and can derive its location.

The use of mobile-based location probing saves airlink capacity and mobile battery power since such probing does not require establishment of a wireless link between the mobile and the network for every location probe operation.

Again, it is to be appreciated that the particular system elements, process operations and other features of the illustrative embodiments described above are presented by way of example only. As indicated previously, the above-described techniques can be adapted in a straightforward manner for use in other types of wireless communication systems and with other types of location-based services. In addition, the invention can be applied to sub-networks or other designated portions of a given wireless network, or to combinations of multiple wireless networks or other networks of potentially differing types. Also, the mobile-server protocols and the particular LBS processing tasks performed by mobile and server may be varied in other embodiments. These and numerous other alternative embodiments within the scope of the appended claims will be readily apparent to those skilled in the art.

We claim:

1. A method of providing location-based services to a mobile user device in a communication system, the method comprising the steps of:
receiving a trigger message from the mobile user device over a wireless link; and
sending an update message to the mobile user device over the wireless link responsive to the trigger message;
wherein the update message is sent within a period of time after receipt of the trigger message that is determined as a function of a dormancy time of the wireless link.

2. The method of claim 1 wherein the receiving and sending steps are implemented at least in part in a server associated with a wireless network that provides the wireless link.

3. The method of claim 1 further comprising the step of receiving a confirmation message from the mobile user device over the wireless link indicating that the update message was received.

4. The method of claim 3 wherein the confirmation message is received within a period of time after sending the update message that is less than the dormancy time of the wireless link.

5. The method of claim 1 further including the steps of determining if the trigger message contains one or more fence-crossing alerts, and for each such fence-crossing alert, determining if a corresponding fence is valid and if the fence is valid forwarding the alert to an application.

6. A processor-readable storage medium containing executable program code which when executed by a processor performs the steps of the method of claim 1.

7. The method of claim 1 wherein the update message is sent within a period of time after receipt of the trigger message that is less than a dormancy time of the wireless link.

8. A method of providing location-based services to a mobile user device in a communication system, the method comprising the steps of:
receiving a trigger message from the mobile user device over a wireless link; and
sending an update message to the mobile user device over the wireless link responsive to the trigger message;
wherein the update message is sent within a period of time after receipt of the trigger message that is less than a dormancy time of the wireless link; and
wherein the method further includes the steps of:
defining an area around a location identified in the trigger message;
selecting stationary fences associated with the mobile user device that overlap with the defined area and that are active or become active within a designated time frame;
determining whether or not one or more proximity-crossing events have occurred with respect to the location and one or more moving fences of respective user device pairs that include the mobile user device; and
for a given proximity-crossing event that has occurred, sending a corresponding alert to an application.

9. The method of claim 8 further including the step of determining a projected time frame within which a proximity-crossing event is likely to occur for at least one user device pair that includes the mobile user device.

10. The method of claim 9 wherein the update message includes the defined area, the selected stationary fences and the projected time frame.

11. An apparatus for use in providing location-based services to a mobile user device in a communication system, the apparatus comprising:
a processing device having a processor coupled to a memory;
wherein the processing device is configured to receive a trigger message from the mobile user device over a wireless link, and to send an update message to the mobile user device over the wireless link responsive to the trigger message;
wherein the update message is sent within a period of time after receipt of the trigger message that is determined as a function of a dormancy time of the wireless link.

12. The apparatus of claim 11 wherein the processing device comprises a server.

13. A method of obtaining location-based service updates in a mobile user device in a communication system, the method comprising the steps of:
sending a trigger message from the mobile user device over a wireless link; and
receiving an update message in the mobile user device over the wireless link responsive to the trigger message;
wherein the update message is received within a period of time after sending the trigger message that is determined as a function of a dormancy time of the wireless link.

14. The method of claim 13 further comprising the step of sending a confirmation message from the mobile user device over the wireless link indicating that the update message was received.

15. The method of claim 14 wherein the confirmation message is sent from the mobile user device within a period of time after receiving the update message that is less than the dormancy time of the wireless link.

16. A processor-readable storage medium containing executable program code which when executed by a processor performs the steps of the method of claim 13.

17. A method of obtaining location-based service updates in a mobile user device in a communication system, the method comprising the steps of:
sending a trigger message from the mobile user device over a wireless link; and
receiving an update message in the mobile user device over the wireless link responsive to the trigger message;
wherein the update message is received within a period of time after sending the trigger message that is less than a dormancy time of the wireless link; and
wherein the update message comprises a defined area around a location identified in the trigger message, one or more stationary fences associated with the mobile user device that overlap with the defined area and that are active or become active within a designated time frame, and a projected time frame within which a proximity-crossing event is likely to occur for at least one user device pair that includes the mobile user device.

18. The method of claim 17 further including the steps of:
performing periodic location probe operations to determine location of the mobile user device;
after performing a given location probe operation, evaluating if the mobile user device has crossed one of the stationary fences or a boundary of the defined area; and
if the mobile user device has crossed one of the stationary fences or the boundary of the defined area, sending an additional trigger message containing one or more corresponding fence-crossing alerts.

19. The method of claim 18 further including the steps of:
after performing a given location probe operation, updating the projected time frame; and
sending an additional trigger message after the updated projected time frame since receipt of the update message has elapsed.

20. The method of claim 18 further including the step of:
if the mobile user device has not crossed one of the stationary fences or the boundary of the defined area, sending an additional trigger message after expiration of a specified maximum time frame since receipt of the update message, or after the mobile user device has moved by more than a specified minimum spatial distance since receipt of the update message.

21. The method of claim 19 wherein the step of updating the projected time frame further comprises the steps of:
if an average speed $s_{avg}$ of the mobile user device since receipt of the update message is less than a designated maximum speed $s_{max}$, updating the projected time frame in accordance with the following equation:

$$\Delta T_T = \Delta T_Z(2-\min(1, s_{avg}/s_{max})),$$

where $\Delta T_T$ denotes the updated projected time frame and $\Delta T_Z$ denotes the projected time frame as received in the update message;

if $\Delta T_T$ is less than a specified minimum value Tmin, then $\Delta T_T$ is set to Tmin; and
if $\Delta T_T$ is greater than a specified maximum value Tmax or no moving fences are present, then $\Delta T_T$ is set to Tmax.

22. The method of claim 17 further including the step of sending an additional trigger message after the projected time frame since receipt of the update message has elapsed.

23. A mobile user device comprising:
a processor;
a memory coupled to the processor; and
a network interface coupled to the processor;
wherein the mobile user device is operative to send a trigger message over a wireless link, and to receive an update message over the wireless link responsive to the trigger message;
wherein the update message is received within a period of time after sending the trigger message that is determined as a function of a dormancy time of the wireless link.

* * * * *